United States Patent
Tiecken et al.

(10) Patent No.: US 10,066,341 B2
(45) Date of Patent: Sep. 4, 2018

(54) FIRE-RETARDANT SHEET MATERIAL

(71) Applicant: TEIJIN ARAMID B.V., Arnhem (NL)

(72) Inventors: Jan David Tiecken, Didam (NL); Monica Lopez Lorenzo, Arnhem (NL); Ben Rolink, Ugchelen (NL); Ernst Michael Winkler, Arnhem (NL)

(73) Assignee: TEIJIN ARAMID B.V., Arnhem (NL)

( * ) Notice: Subject to any disclaimer, the term of this patent is extended or adjusted under 35 U.S.C. 154(b) by 178 days.

(21) Appl. No.: 14/906,203

(22) PCT Filed: Jul. 3, 2014

(86) PCT No.: PCT/EP2014/064216
§ 371 (c)(1),
(2) Date: Jan. 19, 2016

(87) PCT Pub. No.: WO2015/007534
PCT Pub. Date: Jan. 22, 2015

(65) Prior Publication Data
US 2016/0160444 A1  Jun. 9, 2016

(30) Foreign Application Priority Data
Jul. 18, 2013 (EP) .................................. 13177027

(51) Int. Cl.
*D21H 13/26* (2006.01)
*B32B 5/26* (2006.01)
*B68G 7/00* (2006.01)
*D21H 13/40* (2006.01)
*D21H 21/34* (2006.01)
*A47C 31/00* (2006.01)
*D04H 1/4209* (2012.01)
*B32B 5/02* (2006.01)
*B32B 7/12* (2006.01)
*B32B 27/06* (2006.01)
*B32B 27/18* (2006.01)
*B32B 37/12* (2006.01)
*B32B 37/16* (2006.01)

(52) U.S. Cl.
CPC ........... *D21H 13/26* (2013.01); *A47C 31/001* (2013.01); *B32B 5/022* (2013.01); *B32B 5/26* (2013.01); *B32B 7/12* (2013.01); *B32B 27/06* (2013.01); *B32B 27/18* (2013.01); *B32B 37/12* (2013.01); *B32B 37/16* (2013.01); *B68G 7/00* (2013.01); *D04H 1/4209* (2013.01); *D21H 13/40* (2013.01); *D21H 21/34* (2013.01); *B32B 2250/02* (2013.01); *B32B 2262/0269* (2013.01); *B32B 2262/101* (2013.01); *B32B 2262/106* (2013.01); *B32B 2307/3065* (2013.01); *B32B 2307/54* (2013.01); *B32B 2307/72* (2013.01); *B32B 2371/00* (2013.01); *B32B 2601/00* (2013.01); *B32B 2605/00* (2013.01)

(58) Field of Classification Search
CPC ............. A47C 31/001; B32B 2250/02; B32B 2262/101; B32B 2262/106; B32B 2262/0269; B32B 2307/54; B32B 2307/72; B32B 2307/3065; B32B 2371/00; B32B 2601/00; B32B 2605/00; B32B 27/06; B32B 27/18; B32B 37/12; B32B 37/16; B32B 5/26; B32B 5/022; B32B 7/00; B32B 7/12; D04H 1/4209; D21H 13/26; D21H 13/40
See application file for complete search history.

(56) References Cited

U.S. PATENT DOCUMENTS

| | | | |
|---|---|---|---|
| 2004/0033746 A1* | 2/2004 | Kurumatani | B29C 70/081 442/149 |
| 2005/0230072 A1* | 10/2005 | Levit | D21H 13/26 162/146 |

FOREIGN PATENT DOCUMENTS

| | | | |
|---|---|---|---|
| GB | 2 152 542 A | 8/1985 | |
| JP | H0927311 A | 1/1997 | |
| JP | 10046484 A * | 2/1998 | |
| JP | H1046848 A | 2/1998 | |
| JP | 10292289 A * | 11/1998 | |
| JP | H10-292289 A | 11/1998 | |
| WO | 93/23620 A1 | 11/1993 | |
| WO | WO 9949118 A1 * | 9/1999 | ............. B29C 70/12 |
| WO | 2004/099476 A1 | 11/2004 | |
| WO | 2005/059211 A1 | 6/2005 | |
| WO | 2005/103376 A1 | 11/2005 | |

OTHER PUBLICATIONS

JP 10046484 A, Feb. 1998, Machine translation.*
JP 10292289 A, Nov. 1998, MT.*
JP 10292289 A, Nov. 1998, Partial HT.*
Oct. 7, 2014 Written Opinion issued in International Application No. PCT/EP2014/064216.
Oct. 7, 2014 International Search Report issued in International Application No. PCT/EP2014/064216.
Feb. 28, 2017 Office Action issued in Japanese Patent Application No. 2016-526513.

\* cited by examiner

Primary Examiner — Satya B Sastri
(74) Attorney, Agent, or Firm — Oliff PLC

(57) ABSTRACT

A sheet material includes 30-70 wt. % of aramid pulp, 30-70 wt. % of a fire-retardant short fiber material selected from para-aramid, glass fibers, carbon fibers, and PEEK (polyether etherketone), and 0.5-15 wt. % of a polymer binder, wherein the sheet material is a non-woven sheet material having an areal weight of 10-70 g/m². The sheet material is soft, pliable, and light weight. It can be applied as backing onto upholstery material without detrimentally affecting the properties thereof. At the same time, the sheet material has very good fire-retardant properties.

14 Claims, No Drawings

FIRE-RETARDANT SHEET MATERIAL

BACKGROUND

Described herein is a fire-retardant sheet material suitable for use in upholstery applications.

Fire retardancy is an important property in upholstery applications. It is often achieved by the topical application of flame retardant chemicals directly to an outer decorative layer of upholstery material. However, the fire retardancy of these constructions has been found to be not always adequate.

GB2152542 describes a fire-retardant fabric comprising a mixture of components, in particular a three-component system comprising three components selected from aramid fiber, modacrylic fiber, fire-retardant polyester, and fire-retardant viscose.

There is need in the art for improved fire retardancy in upholstery applications. However, the improved fire retardancy should not detrimentally affect the properties of the upholstery material. More specifically, the upholstery material should remain soft and flexible. Further, the weight of the material should not be increased to a too large extent. The present disclosure solves this problem.

The present disclosure pertains to a sheet material which is a non-woven having an areal weight of 10-70 $g/m^2$, which comprises 30-70 wt. % of aramid pulp, 30-70 wt. % of a fire-retardant short fiber material selected from para-aramid, glass fibers, carbon fibers, and PEEK (polyether etherketone), and 0.5-15 wt. % of a polymer binder.

It has been found that the sheet material according to embodiments of the disclosure is soft, pliable, and light weight. It can therefore be applied as backing onto upholstery material without detrimentally affecting the properties thereof. At the same time, the sheet material according to the disclosure has very good fire-retardant properties.

WO93/23620 describes a process for preparing strong aromatic polyamide papers of high porosity by heat treatment of calendered sheets of poly(p-phenylene terephthalamide) short fibers and poly(m-phenylene isophthalamide) fibrids. Fire retardancy is not mentioned, and neither is the sheet material with the composition according to the disclosure.

WO2005103376 describes an aramid paper which is suitable for composite structures, and which is made using a combination of para-aramid pulp, floc, and optionally a polymer binder material. Fire retardancy is not mentioned, and neither is the sheet material with the composition according to the disclosure.

BRIEF SUMMARY

Embodiments of the invention will be discussed in more detail below.

The sheet material according to an embodiment of the disclosure is a non-woven. It has been found that in contrast with woven material non-wovens have better softness and pliability properties.

The sheet material according to an embodiment of the disclosure has an areal weight of 10-70 $g/m^2$. If the areal weight is below 10 $g/m^2$, the material will be difficult to process because its strength may be inadequate for roll to roll processing. If the areal weight is above 70 $g/m^2$, the pliability of the sheet material may be detrimentally affected, and the weight of the upholstery material provided with the sheet material will increase. It may be preferred for the areal weight of the sheet material to be at least 15 $g/m^2$, in particular at least 20 $g/m^2$. It may be preferred for the areal weight of the sheet material to be at most 50 $g/m^2$, in particular at most 40 $g/m^2$.

The sheet material according to an embodiment of the disclosure will generally have a thickness in the range of 10-200 microns, dependent on grammage and density. In one embodiment, the sheet material has a thickness in the range of 80-160 microns.

The sheet material according to an embodiment of the disclosure may have a relatively low density. In one embodiment, the material has a density in the range of 0.1 to 0.5 $g/cm^3$, in particular 0.1 to 0.3 $g/cm^3$. The low density makes for a paper with relatively high softness and pliability.

The sheet material according to an embodiment of the disclosure comprises 30-70 wt. % of aramid pulp, 30-70 wt. % of a fire-retardant short fiber material selected from para-aramid, glass fibers, carbon fibers, and PEEK (polyether etherketone), and 0.5-15 wt. % of a polymer binder. It has been found that these three components are all necessary to obtain a sheet material with the desired combination of properties, in particular strength, softness, pliability, and fire retardancy at the low areal weights.

The aramid pulp contributes in particular to the softness and pliability or flexibility of the sheet material, and to its fire retardancy. As background it may be remarked that chemicals are used in the art to improve the softness of paper materials like tissues. These chemicals are less preferred in fire-retardant applications, and may also affect the strength of the present sheet material.

DETAILED DESCRIPTION

The term "pulp" as used herein refers to particles derived from aramid fibers which are cut to a length of, e.g., 0.5-6 mm, and then subjected to a fibrillation step, wherein the fibers are pulled apart to form fibrils, whether or not attached to a thicker stem. Pulp of this type may be characterized by a length of, e.g., 0.5-6 mm, and a Schopper-Riegler degree of 15-85. In some embodiments, the pulp may have a surface area of 4-20 $m^2/g$.

Within the context of the present specification, the term pulp also encompasses fibrils, i.e., "pulp" which predominantly contains the fibrillated part and little or no fibre stems. This pulp, which is sometimes also indicated as aramid fibril, can, e.g., be obtained by direct spinning from solution, e.g. as described in WO2004/099476, and is also known as "jet-spun pulp". In one embodiment, the pulp has a structural irregularity expressed as a difference in CSF (Canadian Standard Freeness) of never dried pulp and dried pulp of at least 100 ml, preferably of at least 150 ml. In one embodiment fibrils are used having in the wet phase a Canadian Standard Freeness (CSF) value less than 300 ml and after drying a specific surface area (SSA) less than 7 $m^2/g$, and preferably a weight weighted length for particles having a length>250 micron (WL 0.25) of less than 1.2 mm, more preferably less than 1.0 mm. Suitable fibrils and their preparation method are also described, e.g., in WO2005/059211.

Aramid pulp is known in the art, and commercially available from, e.g., Teijin Aramid B.V.

The term "aramid" as used herein refers to an aromatic polyamide which is a condensation polymer of aromatic diamine and aromatic dicarboxylic acid halide. Aramids may exist in the meta-form, the para-form, and the meta-para form.

A meta-aramid is defined as an aramid wherein at least 85% of the bonds between the aromatic moieties are metal-aramid bonds. A para-aramid is defined as an aramid wherein at least 85% of the bonds between the aromatic moieties are para-aramid bonds. A meta-para-aramid is defined as an aramid wherein at least 16% of the bonds between the aromatic moieties are metal-aramid bonds and at least 16% of the bonds between the aromatic moieties are para-aramid bonds. An example of a meta-para aramid, i.e., a copolymer having meta- and para-bonds is copolyparaphenylene/3,4'-oxy-diphenylene terephthalamide (Technora®) which contains about 33% meta-bonds.

Preferably, para-aramid is used as the aramid in embodiments. This preference applies to all forms of aramid as described herein (fibers, pulp, . . . ) unless otherwise specified. It is preferred for the para-aramid used in embodiments to have at least 90%, more in particular at least 95%, of the bonds between the aromatic moieties in the form of para-aramid bonds.

As examples of para-aramid may be mentioned poly (paraphenylene terephthalamide), poly(4,4'-benzanilide terephthalamide), poly(paraphenylene-4,4'-biphenylenedicarboxylic acid amide) and poly(paraphenylene-2,6-naphthalenedicarboxylic acid amide. The use of poly(para-phenylene terephthalamide), also indicated as PPTA, is particularly preferred.

As indicated above, the aramid pulp preferably is para-aramid pulp, in particular PPTA-pulp.

The pulp is present in an amount of 30-70 wt. %. If the amount of pulp is below 30 wt. %, the softness and pliability of the sheet material will not be obtained. The upper limit is determined by the amount of other components present in the sheet material according to the disclosure. It may be preferred for the sheet material to comprise 35 through 60 wt. % of pulp, more specifically 35 to 55 wt. % of pulp.

The sheet material according to embodiments of the disclosure comprises 30-70 wt. % of a fire-retardant short fiber material selected from para-aramid, glass fibers, carbon fibers, and PEEK (polyether etherketone). A fire-retardant fiber material is a material which will self-extinguish when the source of the fire is removed.

In one embodiment the use of aramid fibers, in particular para-aramid fibers, more in particular PPTA fibers is considered preferred, as it has been found that this leads to a sheet material which combines high fire resistance with high strength at low areal weights. In another embodiment, the fire-retardant fibers are glass fibers. Glass fibers are widely available in numerous different grades, and have been found to provide a sheet material with good properties, as can be seen from the examples.

It may be preferred for the sheet material to comprise 35 through 60 wt. % of fire retardant fiber material, more specifically 35 to 55 wt. % of fire-retardant fiber material.

It is possible to use a single type of fire-retardant short fiber material, but the use of combinations of different types of fire-retardant short fiber material selected from para-aramid, glass fibers, carbon fibers, and PEEK (polyether etherketone) is also within the scope of the present disclosure.

The fibers used in the sheet material according to embodiments of the disclosure have a length of e.g., 3-15 mm. This type of material is often indicated as "short fiber", "short-cut", or "floc", and can, e.g., be obtained by cutting endless fibers to the desired length. It has been found that the use of fibers with a longer length will lead to a sheet material which is less soft and less pliable. On the other hand, if the length is below 3 mm, the strength of the sheet material may be insufficient. To increase softness and pliability it may be preferred for the fibers to have a length in the range of at most 10 mm, more in particular at most 8 mm. It may be preferred for the fibers to have a length of at least 4 mm to obtain appropriate strength.

The thickness of the fibers may vary within wide ranges, e.g., between 2 and 18 micron. It has been found, however, that thinner fibers may be preferred, because they provide increased softness and pliability. Therefore, it may be preferred for the fibers to have a thickness below 13 micron, more in particular below 10 micron, specifically in the range of 2 to 8 micron.

The sheet material according to embodiments of the disclosure comprises 0.5-15 wt. % of a polymer binder. It has been found that the presence of polymer binder is required to provide sufficient strength to the sheet material. Suitable polymer binders are known in the art. They include meltable or soluble materials like polyolefins, polyvinyl alcohol, polyesters, polyethers, wet strength agents, polyethers, etc. The use polyvinyl alcohol is considered preferred at this point in time.

The binder is present in an amount of 0.5-15 wt. %. If less than 0.5 wt. % of binder is used, the strength of the sheet material will be insufficient for use in a roll-to-roll process. On the other hand, the presence of large amounts of binder is detrimental, because it reduces the softness, the pliability, and the fire resistance of the sheet material. It is preferred for the amount of binder to be in the range of 0.5 to 10 wt. %, in particular 0.5 to 7 wt. %, more in particular 0.5 to 5 wt. %. In some embodiments, lower amounts of binder may be used, e.g., in the range of 0.5 to 3 wt. %.

The sheet material according to embodiments of the disclosure has a high pliability. In one embodiment, the sheet material has a pliability of at least 0.5 mm/N, more in particular at least 0.7 mm/N. Higher values, such as at least 0.9 mm/N can also be obtained. It is even possible to obtain values of at least 1.2 mm/N or even at least 1.3 mm/N. Pliability may be determined using an Emtec Tissue Softness Analyser (TSA).

The sheet material according to embodiments of the disclosure has a high softness. In one embodiment, the sheet material has a softness of at least 60, more in particular at least 70. Higher values, such as at least 75 can also be obtained. It is even possible to obtain values of at least 85 or even at least 85. Softness may be measured as "handfeel values" using an Emtec Tissue Softness Analyser (TSA).

The strength requirements on the sheet material according to embodiments of the disclosure are not very stringent. The main requirement is that the sheet material shows sufficient strength to be processable through roll-to-roll applications. In one embodiment, the sheet material has a tensile strength of at least 1.0 N/cm, in particular at least 1.3 N/cm. Tensile strength is determined in accordance with ISO 1924.

In a particularly preferred embodiment, the disclosure pertains to a sheet material which is a non-woven sheet material having an areal weight of 20-40 g/m$^2$ and a density of 0.1 to 0.3 g/cm$^3$, which comprises 30-70 wt. % of para-aramid pulp, in particular 35 to 60 wt. %, more in particular 35 to 55 wt. %, and 30-70 wt. %, in particular 35 to 60 wt. %, more in particular 35 to 55 wt. % of glass fibers, and 0.5-7 wt. % of a PVA polymer binder, with the glass fibers having a length of at most 8 mm and at least 4 mm.

The sheet material may also contain further components, as long as they do not interfere with the properties of the sheet material.

The disclosure also relates to a method of making the present sheet material. In the process according to embodiments of the disclosure, a suspension, generally an aqueous suspension, is prepared comprising aramid pulp and fire-retardant fiber. The suspension is applied onto a porous screen, so as to lay down a mat of randomly interwoven material onto the screen. Water is removed from this mat, e.g., by pressing and/or applying vacuum, followed by drying to form the sheet material. There are various methods to incorporate the binder into the sheet material. In one embodiment the binder is incorporated in the suspension described above. In this embodiment, the binder generally is a solid material, e.g., in the form of particles or shortcut fibers. In another embodiment in a first step a sheet is formed from the suspension as described above, and the binder is applied onto the sheet. This will generally be done after dewatering, but before drying. The application of the binder onto the sheet can be done, e.g., by spraying a solution of binder onto the sheet, or by other suitable methods.

In paper making processes a calendering step is often carried out, to increase the density of the paper. Calendering steps generally involve passing the paper through a set of rolls to apply pressure and/or temperature onto the paper. It was found that calendaring steps may detrimentally affect the properties of the sheet material, in particular softness and pliability. It is therefore preferred not to subject the sheet material to a calendaring step. This is a method to obtain the relatively low density papers described above.

The sheet material of embodiments of the present disclosure is of particular use as backing in upholstery applications. The present disclosure also pertains to an object comprising upholstery material and the sheet material as described above. The upholstery material can be any material used in upholstery applications, such as textile, but also leather, plastics, etc. The object may be furniture, but also an upholstered object used in other applications, e.g., interior parts of cars, trains, ships, aircraft.

The sheet material can be applied onto the back of the upholstery material, e.g., through a lamination process comprising providing a layer of upholstery material, providing a layer of sheet material, and connecting the layer of upholstery material and the layer of sheet material together, e.g., through an intermediate layer of adhesive. The disclosure also pertains to a fire retardant upholstery material which comprises a layer of upholstery material and a layer of the sheet material as described above.

It is noted that the embodiments of the sheet material described herein may be combined with each other in manners clear to the skilled person. All embodiments and properties described for the sheet material are also applicable to the method for manufacturing the sheet material, individually or in combination. All embodiments and properties described for the sheet material are also applicable to the use thereof in any application, individually or in combination.

The present disclosure will be elucidated with reference to the following examples, without being limited thereto or thereby.

EXAMPLES

General Manufacturing Procedure:

All recipes have been made on the Rapid Koethen (RK) handsheet former according to the method of ISO 5269-2. Drying was done using the RK-dryer under vacuum at 95° C.

The thickness of the papers was measured according to ASTM-D374

Tensile index (TI) was determined in accordance with ISO 1924-2.

Flammability test was performed setting a flame under a horizontally placed test sample for a specified period of time (normally 90 seconds), and measuring the time takes for the flame to break through the paper. After 90 seconds the flame is removed and the period is determined until the material self-extinguishes.

Pliability, also indicated as flexibility, and softness, also indicated as handfeel, were determined using an Emtec Tissue Softness Analyzer.

Starting Materials were as Follows:

Two types of PPTA pulp were used.

Aramid pulp Type 1 was a para-aramid pulp with a length average between 1.15 and 0.65 mm (mean value 0.9 mm), and a specific surface area between 12 and 8.0 m$^2$/g (mean value 10.0)

Aramid pulp Type 2 was a para-aramid pulp with a length average between 0.75 and 1.2 mm (mean value 0.98 mm), and a Shopper Riegler value of 16 to 30 (mean value 25)

Two types of glass fiber were used:

Glass fiber Type 1 had a length of 6 mm, a thickness of 6.5 microns, and a dry solids % of 85.85.

Glass fiber Type 2 had a length of 10 mm, a thickness of 10 microns, and a dry solids % of 89.61.

Aramid fiber was Twaron shortcut with a length of 6 mm and a thickness of 12 micron.

PVA binder was Kuralon VPB105-2 4 mm (1.17 dT)

Example 1

Sheets were made according to the method described above. The compositions, flexibility and handfeel of the papers are provided in Table 1. The grammage, thickness, density, temsile index, tensile strength, and elongation at break are provided in Table 2.

TABLE 1

|  | % Twaron short cut | % Glass fiber - Type 1 | % Aramid pulp - Type 1 | % PVA | D flexibility (mm/N) | Handfeel |
|---|---|---|---|---|---|---|
| Sample 1 | 0 | 50 | 40 | 10 | 0.91 | 72.9 |
| Sample 2 | 0 | 50 | 45 | 5 | 1.00 | 80.4 |
| Sample 3 | 0 | 50 | 48 | 2 | 1.34 | 89.7 |
| Sample 4 | 50 | 0 | 45 | 5 | 0.76 | 70.5 |
| Sample 5 | 50 | 0 | 48 | 2 | 0.78 | 75.3 |

TABLE 2

|  | Grammage g/m$^2$ | Thickness (micron) | Density g/cm$^3$ | TI (Nm/g) | Tensile strength (N/cm) | EAB (%) |
|---|---|---|---|---|---|---|
| Sample 1 | 26.1 | 119 | 0.22 | 12 | 3.1 | 0.72 |
| Sample 2 | 26.1 | 117 | 0.22 | 7.3 | 1.9 | 0.55 |
| Sample 3 | 25.7 | 117 | 0.21 | 5.4 | 1.4 | 0.5 |
| Sample 4 | 26.1 | 160 | 0.16 | 19 | 5.0 | 0.64 |
| Sample 5 | 26.8 | 156 | 0.17 | 4.99 | 1.3 | 0.39 |

As can be seen from Table 1, all samples show adequate flexibility and handfeel. A comparison between Sample 3 and Sample 5 shows that the use of glass fiber instead of aramid fiber leads to a paper with higher flexibility and better handfeel. A comparison between Sample 2 and Sample 4 supports the same conclusion. A comparison between samples 1, 2, and 3 shows that a decrease in % PVA and an increase in amount of aramid pulp leads to an increase in flexibility and handfeel.

From Table 2 is can be seen that all samples show adequate properties. From a comparison between samples 2 and 4 or 3 and 5 it can be seen that replacing glass fiber with aramid fiber will lead to increased strength, however, while affecting flexibility and handfeel.

Example 2

Sheets were made according to the method described above. The compositions and flammability results are provided in Table 3.

TABLE 3

|  | % Glass fiber (type) | % Twaron pulp Type 2 | % Twaron pulp Type 1 | % PVA | Burn through (s) | Flame stopped (s) | Break through |
|---|---|---|---|---|---|---|---|
| Sample 6 | 40% - Type 2 | 35 | 15 | 10 | 68 | 90 | Yes |
| Sample 7 | 40% - Type 2 | 40 | 15 | 5 | 75 | 90 | Yes |
| Sample 8 | 35% - Type 2 | 55 | 0 | 10 | no burn through | 130 | No |
| Sample 9 | 52% - Type 1 |  | 45 | 5 | no burn through | 150 | No |

From Table 3 it can be seen that all materials show fire retardancy in that the material self-extinguishes after a certain period of time. This allows reaching the high levels of safety demanded in the industry. In some cases, the material did not burn through. This would help to maintain the integrity of the upholstered structure provided with upholstery material according to the disclosure.

The invention claimed is:

1. A Sheet material comprising:
   30-60 wt. % of aramid pulp,
   30-60 wt. % of a fire-retardant short fiber material selected from the group consisting of para-aramid, glass fibers, carbon fibers, and PEEK (polyether etherketone), and
   0.5-7 wt. % of a polymer binder,
   wherein the sheet material is a non-woven sheet material having an areal weight of 10-70 g/m$^2$
   and wherein the polymer binder is a meltable material.

2. The Sheet material according to claim 1, wherein the areal weight is at least 15 g/m$^2$.

3. The Sheet material according to claim 1, wherein the aramid pulp is para-aramid pulp.

4. The Sheet material according to claim 1, wherein the fire-retardant short fiber material is selected from the group consisting of para-aramid fibers and glass fibers.

5. The Sheet material according to claim 1, wherein the fibers in the short fiber material have a length of 3-15 mm.

6. The Sheet material according to claim 1, wherein the sheet material comprises 35 through 60 wt. % of pulp.

7. The Sheet material according to claim 1, wherein the sheet material comprises 35 through 60 wt. % of fire retardant short fiber material.

8. A Method for manufacturing the sheet material according to claim 1, comprising:
   preparing a suspension comprising aramid pulp and fire-retardant fiber in a liquid,
   applying the suspension onto a porous screen so as to lay down a mat of randomly the material onto the screen,
   removing liquid from the mat, and
   drying the mat to form the sheet material,
   wherein the binder is added to the suspension and/or to the mat of the material.

9. The Method according to claim 8, wherein the binder is incorporated in the suspension in the form of a solid material.

10. The Method according to claim 8, wherein the binder is applied onto the mat of the material.

11. An Object comprising upholstery material and the sheet material according to claim 1.

12. The Object according to claim 11, wherein the object is upholstered furniture, or an interior parts of cars, trains, ships, or aircraft.

13. An Upholstery material comprising a layer of upholstery material and a layer of sheet material according to claim 1.

14. A Method for manufacturing an upholstery material according to claim 13, comprising:
   providing a layer of upholstery material,
   providing a layer of sheet material, and
   connecting the layer of upholstery material and the layer of sheet material together.

* * * * *